(12) United States Patent
Gates

(10) Patent No.: US 6,425,446 B1
(45) Date of Patent: Jul. 30, 2002

(54) HARROW TINE WITH A CUTTING EDGE

(76) Inventor: Michael Gates, 8710 - 33rd Ave. NW., Lansford, ND (US) 58750

( * ) Notice: Subject to any disclaimer, the term of this patent is extended or adjusted under 35 U.S.C. 154(b) by 0 days.

(21) Appl. No.: 09/640,444

(22) Filed: Aug. 17, 2000

(51) Int. Cl.⁷ .......................... A01B 23/02; A01B 35/24
(52) U.S. Cl. ...................................... 172/707
(58) Field of Search ................... 172/747, 707, 172/772, 772.5

(56) References Cited

U.S. PATENT DOCUMENTS

| | | | | |
|---|---|---|---|---|
| 506,654 A | * | 10/1893 | Baldwin | 172/707 |
| 1,872,072 A | * | 8/1932 | Chibnik | 172/747 |
| 1,965,950 A | * | 7/1934 | Walker | 172/747 |
| 3,469,637 A | * | 9/1969 | Kennedy | 172/709 |
| 3,882,594 A | | 5/1975 | Jackson et al. | 228/122 |
| D237,644 S | * | 11/1975 | Williams et al. | D15/3 |
| 3,921,726 A | * | 11/1975 | Connor et al. | 172/646 |
| 3,921,727 A | * | 11/1975 | Andersen et al. | 172/708 |
| 4,052,802 A | | 10/1977 | Moen et al. | 37/141 |
| 4,079,790 A | * | 3/1978 | Guttler | 172/643 |
| 4,363,364 A | | 12/1982 | Wetmore | 172/732 |
| 4,534,418 A | * | 8/1985 | Hegemann et al. | 172/708 |
| 4,625,810 A | * | 12/1986 | Edmission | 172/749 |
| 4,753,299 A | | 6/1988 | Meyers | 172/777 |
| 4,754,816 A | * | 7/1988 | Edmission | 172/749 |
| 4,770,253 A | | 9/1988 | Hallissy et al. | 172/701.3 |
| 4,781,254 A | * | 11/1988 | Johnson | 172/730 |
| 4,834,190 A | * | 5/1989 | Kyle | 172/704 |
| 5,027,907 A | | 7/1991 | Delyea | 172/707 |
| 5,314,029 A | * | 5/1994 | Rowlett | 172/699 |
| 5,427,186 A | | 6/1995 | Adrian et al. | 172/701.3 |
| 5,979,568 A | * | 11/1999 | Parish | 172/724 |
| 6,138,771 A | * | 10/2000 | Skjaeveland | 172/708 |

* cited by examiner

Primary Examiner—Thomas B. Will
Assistant Examiner—Kristine Markovich
(74) Attorney, Agent, or Firm—Michael S. Neustel

(57) ABSTRACT

A harrow tine with a cutting edge for increasing the efficiency and useful life of a harrow tine. The inventive device includes a harrow tine, and a hardened edge member attached to a lower end of the harrow tine for engaging a ground surface. The hardened edge member preferably is tapered forwardly thereby creating a syncline shaped structure with a leading edge which easily penetrates the ground surface. The edge member is preferably constructed of a hardened material such as but not limited to chrome.

4 Claims, 2 Drawing Sheets

HARROW TINE WITH A CUTTING EDGE

BACKGROUND OF THE INVENTION

1. Field of the Invention

The present invention relates generally to harrow tines and more specifically it relates to a harrow tine with a cutting edge for increasing the efficiency and useful life of a harrow tine.

2. Description of the Prior Art

Harrow tines have been in use for years. Typically, a conventional harrow tine has a pair of shafts extending from a coil spring structure that engage the ground surface thereby agitating the surface of the ground.

The main problem with conventional harrow tines is that they do not easily penetrate extremely hardened ground surfaces because of the relatively blunt shafts. Another problem with conventional harrow tines is that they tend to wear relatively quickly within various types of soil conditions thereby requiring the user to replace them.

Examples of patented harrow tines and the like include U.S. Pat. No. 3,882,594 to Jackson et al.; U.S. Pat. No. 5,314,029 to Rowlett; U.S. Pat. No. 4,363,364 to Wetmore; U.S. Pat. No. 5,427,186 to Adrian et al.; U.S. Pat. No. 5,027,907 to Delyea; U.S. Pat. No. 4,753,299 to Meyers; U.S. Pat. No. 4,770,253 to Hallissy et al.; U.S. Pat. No. 4,052,802 to Moen et al. which are all illustrative of such prior art.

While these devices may be suitable for the particular purpose to which they address, they are not as suitable for increasing the efficiency and useful life of a harrow tine. Conventional harrow tines do not provide extended periods of usage nor are they suitable for extremely hardened ground surfaces.

In these respects, the harrow tine with a cutting edge according to the present invention substantially departs from the conventional concepts and designs of the prior art, and in so doing provides an apparatus primarily developed for the purpose of increasing the efficiency and useful life of a harrow tine.

SUMMARY OF THE INVENTION

In view of the foregoing disadvantages inherent in the known types of harrow tines now present in the prior art, the present invention provides a new harrow tine with a cutting edge construction wherein the same can be utilized for increasing the efficiency and useful life of a harrow tine.

The general purpose of the present invention, which will be described subsequently in greater detail, is to provide a new harrow tine with a cutting edge that has many of the advantages of the harrow tines mentioned heretofore and many novel features that result in a new harrow tine with a cutting edge which is not anticipated, rendered obvious, suggested, or even implied by any of the prior art harrow tines, either alone or in any combination thereof.

To attain this, the present invention generally comprises a harrow tine, and a hardened edge member attached to a lower end of the harrow tine for engaging a ground surface. The hardened edge member preferably is tapered forwardly thereby creating a syncline shaped structure with a leading edge which easily penetrates the ground surface. The edge member is preferably constructed of a hardened material such as but not limited to chrome.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a harrow tine with a cutting edge that will overcome the shortcomings of the prior art devices.

A second object is to provide a harrow tine with a cutting edge for increasing the efficiency and useful life of a harrow tine.

Another object is to provide a harrow tine with a cutting edge that increases the agitation of the ground surface.

An additional object is to provide a harrow tine with a cutting edge that easily penetrates a hardened ground surface.

A further object is to provide a harrow tine with a cutting edge that save time and money during extended usage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
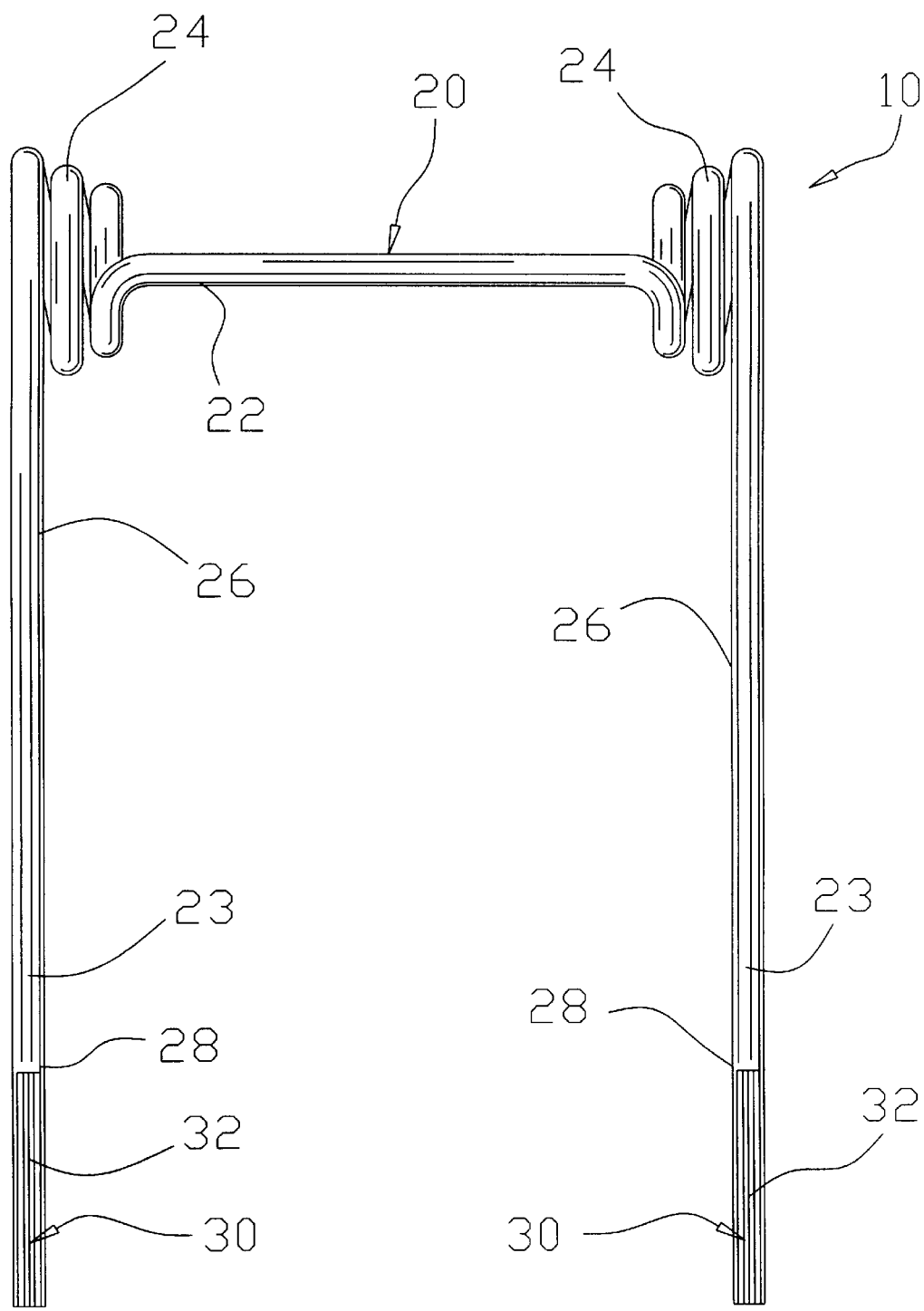
FIG. 1 is a front view of the present invention.

Turning now descriptively to the drawings, in which similar reference characters denote similar elements throughout the several views, FIGS. 1 through 4 illustrate a harrow tine with a cutting edge 10, which comprises a harrow tine 20, and a hardened edge member 30 attached to a lower end 28 of the harrow tine 20 for engaging a ground surface. The hardened edge member 30 preferably is tapered forwardly thereby creating a syncline shaped structure with a leading edge that easily penetrates the ground surface. The edge member 30 is preferably constructed of a hardened material such as but not limited to chrome.

Figure 3:
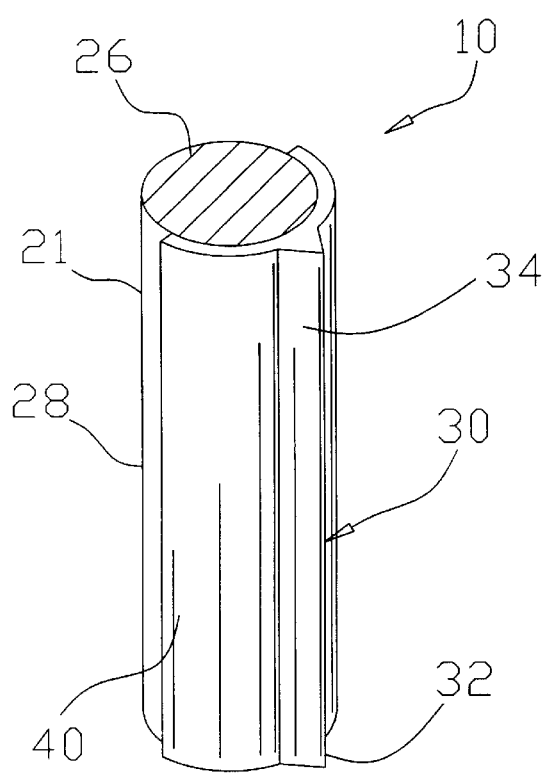
FIG. 3 is a magnified upper perspective view of the V-shaped hardened material upon the lower portion of one of the shafts.
Figure 4:
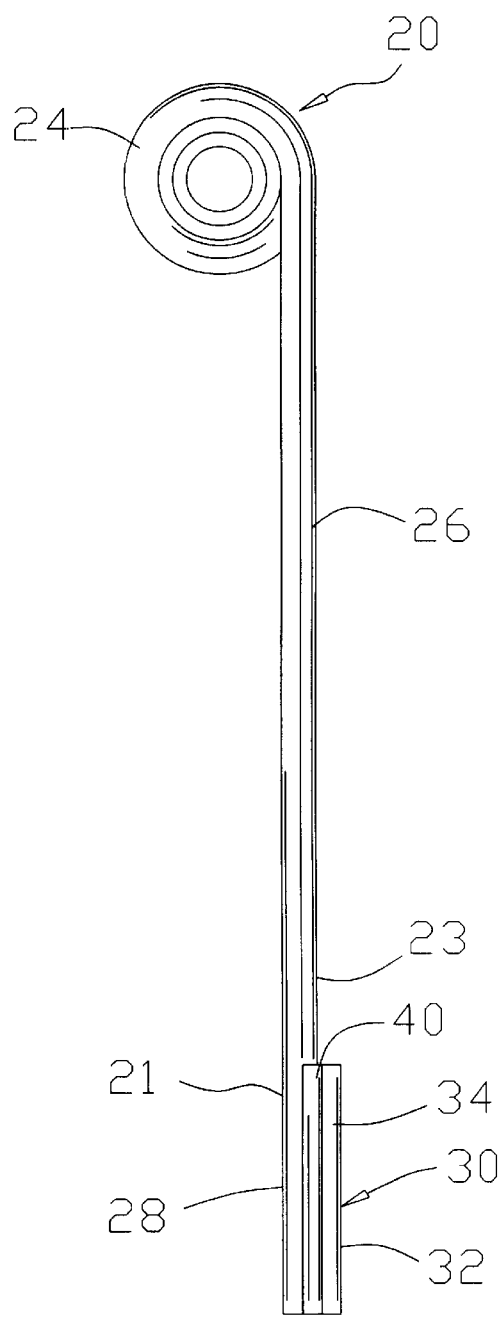
FIG. 4 is a side view of the present invention.

As shown in FIG. 1 of the drawings, a cross member 22 having a pair of coil springs 24 at opposing ends is provided with a harrow tine 20 extending downwardly from each of the coil springs 24. The harrow tine 20 is comprised of a shaft 26 having an upper end and a lower end 28 as shown in FIGS. 1, 3 and 4 of the drawings. It can be appreciated that the shaft 26 can be constructed of various lengths and diameters as desired.

As shown in FIGS. 1 through 4 of the drawings, an edge member 30 is secured to a front portion of the shaft 26 adjacent the lower end 28. A body 40 is also attached to the shaft 26 between the shaft 26 and the edge member 30. The body 40 is formed about a portion of the shaft 26 and is constructed of a hardened material.

Figure 2:
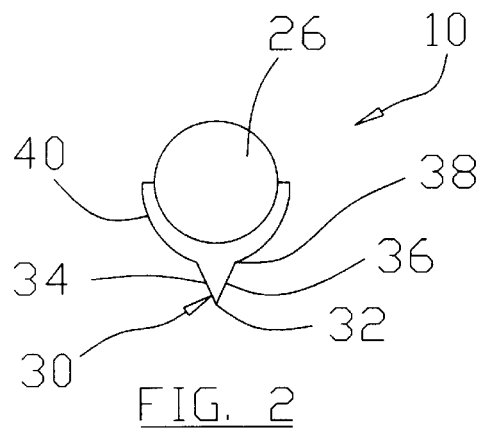
FIG. 2 is a bottom view of a shaft member showing the V-shaped hardened material.

As best shown in FIGS. 2 and 3 of the drawings, the edge member 30 includes a cutting edge for penetrating the ground surface. The edge member 30 is tapered from the front portion of the shaft 26 or the body 40 as best shown in FIG. 2 of the drawings. As further shown in FIG. 2 of the drawings, the edge member 30 is syncline shaped to form the cutting edge. As best shown in FIGS. 1 and 4 of the drawings, the edge member 30 extends along less than twenty percent of a total length of the shaft 26 and is preferably attached to the lower end 28 of the shaft 26 for engaging the ground surface.

The edge member 30 and the body 40 are preferably comprised of a hardened material such as but not limited to chrome. The hardened material reduces the wearing of the shaft 26 during usage and increases the ability of the harrow tine 20 to penetrate the ground surface during extended periods of usage.

As further shown in FIGS. 1 through 4 of the drawings, the edge member 30 preferably includes a base portion opposite of the cutting edge wherein the base portion has a width less than a diameter of the shaft 26. The edge member 30 further has a distance extending between the base portion and the cutting edge that is less than a diameter of the shaft 26.

In use, the harrow tine 20 is secured to a harrow implement wherein the harrow implement is connected to a tractor or the like. The edge member 30 engages the ground surface during operation of the harrow implement thereby reducing engagement of the ground surface directly to the shaft 26 which reduces wearing upon the shaft 26 which is constructed of a softer material to maintain a reduced cost of manufacturing. The cutting edge of the edge member 30 engages and penetrates the ground surface thereby increasing the overall efficiency of the harrow tine 20 in operation. The body 40 increases the surface area protecting the shaft 26 of the harrow tine 20 thereby further increasing the useful life of the harrow tine 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A harrow tine with a cutting edge, comprising:

a shaft having an upper end, a lower end, a rear surface and front surface, wherein said shaft has a circular cross sectional area divided into a front half and a rear half; and an edge member having a base portion and a cutting edge having a straight structure, wherein said base portion is permanently secured to said front surface of said shaft adjacent said lower end;

wherein said edge member is tapered from said base portion to said cutting edge;

wherein said edge member has a pair of opposing side walls at an acute angle with respect to one another;

wherein said cutting edge is forwardly aligned with a travel path of said shaft for severing a ground surface in front of said shaft;

wherein said cutting edge is parallel to said shaft;

wherein said edge member is syncline shaped;

wherein said edge member extends along less than 20 percent of a total length of said shaft;

wherein said edge member is comprised of a hardened material;

wherein said base portion of said edge member has a width less than a diameter of said shaft.

2. The harrow tine with a cutting edge of claim 1, wherein said hardened material is chrome.

3. The harrow tine with a cutting edge of claim 1, wherein said edge member is welded to said shaft.

4. The harrow tine with a cutting edge of claim 1, wherein said edge member has a distance extending between said base portion and said cutting edge, wherein said distance is less than a diameter of said shaft.

* * * * *